(12) United States Patent
Tsujimoto (10) Patent No.: US 11,880,615 B2
(45) Date of Patent: Jan. 23, 2024

(54) IMAGE FORMATION APPARATUS AND METHOD FOR CONTROLLING IMAGE FORMATION APPARATUS WITH SPECIFYING USER TRACKING INFORMATION

(71) Applicant: SHARP KABUSHIKI KAISHA, Sakai (JP)

(72) Inventor: Sho Tsujimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/138,104

(22) Filed: Apr. 23, 2023

(65) Prior Publication Data

US 2023/0342094 A1 Oct. 26, 2023

Related U.S. Application Data

(63) Continuation of application No. PCT/JP2021/042841, filed on Nov. 22, 2021.

(30) Foreign Application Priority Data

Apr. 26, 2022 (JP) .................... 2022-071991

(51) Int. Cl.
*G06F 3/12* (2006.01)

(52) U.S. Cl.
CPC .......... *G06F 3/1222* (2013.01); *G06F 3/1238* (2013.01); *G06F 3/1242* (2013.01)

(58) Field of Classification Search
CPC ..... G06F 3/1222; G06F 3/1238; G06F 3/1242

USPC ....................................... 358/1.14
See application file for complete search history.

(56) References Cited

U.S. PATENT DOCUMENTS

| | | | |
|---|---|---|---|
| 2011/0063667 A1* | 3/2011 | Nishida | G06F 21/608 358/1.15 |
| 2012/0188581 A1* | 7/2012 | Kakutani | H04N 1/00846 358/1.14 |
| 2017/0013152 A1* | 1/2017 | Morii | H04N 1/00509 |
| 2022/0317960 A1* | 10/2022 | Kobayashi | B41J 29/38 |

FOREIGN PATENT DOCUMENTS

JP      2006186814 A      7/2006

* cited by examiner

*Primary Examiner* — Allen H Nguyen
(74) *Attorney, Agent, or Firm* — ScienBiziP, P.C.

(57) ABSTRACT

An image formation apparatus includes an accepting portion that accepts authentication information for identifying whether a user is an authorized user having a right to use the image formation apparatus; an authenticator that authenticates whether the user is the authorized user, based on the authentication information accepted by the accepting portion; and an adder that adds, to an image to be printed, tracking information including information for specifying the user authenticated as the authorized user by the authenticator. If the authentication information accepted by the accepting portion is single identification information, the adder adds, as the tracking information, to the image, user specifying information for specifying the user authenticated as the authorized user, the user specifying information being different from the single identification information.

8 Claims, 10 Drawing Sheets

USER AUTHENTICATION

INPUT LOGIN NAME AND PASSWORD

LOGIN NAME | TOUCH TO INPUT LOGIN NAME | SELECT FROM LIST

PASSWORD | TOUCH TO INPUT PASSWORD

USER AUTHENTICATION

PLEASE INPUT YOUR USER NUMBER.

7 8 9
4 5 6
1 2 3
0 C

ADMINISTRATOR LOGIN

| PRINT TRACKING INFORMATION |
|---|

PRINT SETTING     [ENABLED ▼]

PRINT CONTENT

- [✓] DATE AND TIME
- [✓] LOGIN NAME/USER NAME
- [ ] CHARACTER STRING [____]
- [ ] SERIAL No. xxxxxxxxx
- [✓] JOB SERIAL NUMBER
- [✓] FILE NAME

[REGISTER]

FIG. 7

20210101_093015_UserName_FileName.docx_123

20210101_093015_UserName_FileName.docx_123

FIG. 8

20210101_093015_UserName_FileName.docx_123

IMAGE FORMATION APPARATUS AND METHOD FOR CONTROLLING IMAGE FORMATION APPARATUS WITH SPECIFYING USER TRACKING INFORMATION

CROSS-REFERENCE TO RELATED APPLICATION

The present application claims priority from Japanese Application JP2022-071991, the content of which is hereby incorporated by reference into this application.

BACKGROUND OF THE INVENTION

1. Field of the Invention

The present disclosure relates to an image formation apparatus and a method for controlling an image formation apparatus.

2. Description of the Related Art

In the prior art, there is disclosed a printed matter output apparatus for composing printed material identification information onto a printed material in outputting the printed material. The printed material output apparatus disclosed in the prior art can check and prevent illegal duplication, falsification, and the like.

SUMMARY OF THE INVENTION

However, the apparatus disclosed in the prior art is configured to add individual authentication information and timestamp information, as tracking information (print document identification information), to a printed material, and thus, the individual authentication information may illegally be used by a third person looking at the printed material.

An object of one aspect of the present disclosure is to provide an image formation apparatus by which it is possible to output an image added appropriately with tracking information.

An image formation apparatus according to an aspect of the present disclosure includes an accepting portion that accepts authentication information for identifying whether a user is an authorized user having a right to use the image formation apparatus, an authenticator that authenticates whether the user is the authorized user, based on the authentication information accepted by the accepting portion, and an adder that adds, to an image to be printed, tracking information including information for specifying the user authenticated as the authorized user by the authenticator, in which if the authentication information accepted by the accepting portion is single identification information, the adder adds, as the tracking information, to the image user specifying information for specifying the user authenticated as the authorized user, the user specifying information being different from the single identification information.

According to one aspect of the present disclosure, the image formation apparatus provides an effect of outputting an image appropriately added with tracking information.

DETAILED DESCRIPTION OF THE INVENTION

An embodiment of the present disclosure will be described with reference to the drawings. It is noted that throughout all the drawings, the same or corresponding elements are denoted below by the same reference numerals, and duplicate descriptions thereof will be omitted. Moreover, the embodiment described below is merely an example of the present disclosure, and the present disclosure is not limited to such an embodiment. Any other embodiment other than such an embodiment may be modified in various ways according to the design and the like within the scope not departing from the technical idea of the present disclosure.

Figure 1:
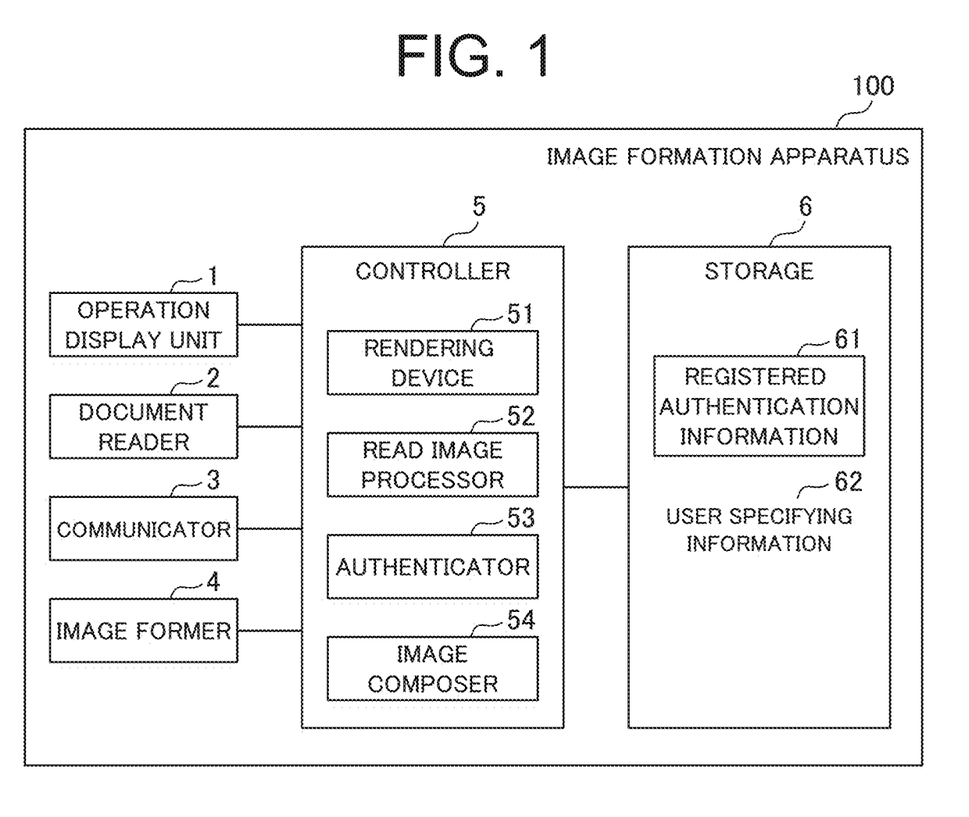
FIG. 1 is a block diagram illustrating an example of a configuration of main components of an image formation apparatus according to an embodiment of the present disclosure.

An image formation apparatus 100 according to an embodiment will be described with reference to FIG. 1. FIG. 1 is a block diagram illustrating an example of a configuration of main components of the image formation apparatus 100 according to an embodiment of the present disclosure.

The image formation apparatus 100 according to the embodiment is an apparatus for printing multicolored and monochrome images on a sheet. As illustrated in FIG. 1, the image formation apparatus 100 includes an operation display unit 1 (an accepting portion, an outputter, and a setter), a document reader 2, a communicator 3, an image former 4, a controller 5, and a storage 6.

The operation display unit 1 is a user interface used for accepting an input such as information or an operation instruction from a user and performing various types of settings in the image formation apparatus 100. Example of the operation display unit 1 may include a touch panel in which a display device such as a liquid crystal panel and an input device such as a touch pad are combined.

More specifically, in printing an image onto the sheet by the image former 4, the operation display unit 1 accepts input of authentication information for identifying whether a user instructing to print the image is an authorized user having a right to use the image formation apparatus 100. The operation display unit 1 allows for displaying a screen to prompt for input of information and the like to be set in the image formation apparatus 100.

In other words, the operation display unit 1 may function as an accepting portion that accepts the authentication information for identifying whether the user is an authorized user having a right to use the image formation apparatus 100. The operation display unit 1 may also function as an outputter that outputs a display to prompt the user authenticated as an authorized user to input information such as user specifying information 62. The operation display unit 1 may also function as a setter that sets switching between a first authentication mode for accepting a login name and a password as the authentication information and a second authentication mode for accepting single identification information as the authentication information.

The document reader 2 is, for example, a scanner, and acquires image data from a set document. The document reader 2 may read a reflected light image from a document as RGB (R: red, G: green, B: blue) analog signals with the use of a charge coupled device (CCD) to acquire the image data.

The communicator 3 is an adapter for communicating with an unillustrated external information processing device arranged outside. The image formation apparatus 100 is connected via the communicator 3 to a communication network to which an information processing device is connected. Therefore, the image formation apparatus 100 acquires the image data from the information processing device through the communication network.

The image former 4 prints an image generated based on the image data acquired by the document reader 2 or the image data received from the external information processing device via the communicator 3, onto a sheet. An example of a method of printing an image by the image former 4 includes an inkjet method or a sublimation printing method.

The controller 5 controls various types of processing of each component included in the image formation apparatus 100. The controller 5 may be realized by, for example, an arithmetic processing device such as a central processing unit (CPU) or a micro processing unit (MPU). The controller 5 includes a rendering device 51, a read image processor 52, an authenticator 53, and an image composer 54 (adder), as functional blocks for performing print processing described later.

The rendering device 51 generates an image to be printed by the image former 4, based on the image data received from the external information processing device via the communicator 3.

The read image processor 52 generates the image to be printed by the image former 4, based on the image data acquired by the document reader 2.

The authenticator 53 identifies whether a user instructing the print processing in the image formation apparatus 100 is an authorized user having the right to use the image formation apparatus 100. The image formation apparatus 100 is configured to execute login processing of requesting the user to log in when instructing execution of the print processing. The authenticator 53 compares the authentication information accepted by the operation display unit 1 in the login processing with registered authentication information 61 stored in advance in the storage 6 to identify whether the user instructing the print processing is the authorized user. If the authenticator 53 identifies the user as the authorized user, the user may be permitted to execute the print processing by the image formation apparatus 100.

The image composer 54 generates an image obtained by adding tracking information to the image generated by the rendering device 51 or the read image processor 52. Here, the tracking information is information allowing for tracing an origin of a printed material from a printed material printed thereon with the image. Examples of the tracking information include information for specifying the authorized user serving as a creator of the printed material and, and information such as a date and a time when the printed material is created and a file name of the image data for generating the image.

The storage 6 is a storage medium readable and writable by the controller 5, and an example thereof includes a hard disk. The storage 6 stores registered authentication information 61 and user specifying information 62. The registered authentication information 61 is information for identifying whether the user is the authorized user, and is information registered in advance by the authorized user in the image formation apparatus 100.

It is noted that in a case of a first authentication mode in which the user inputs a login name and a password as the authentication information at the time of login, the registered authentication information 61 stored in the storage 6 acts as information indicating a combination of the login name and the password indicating the authorized user.

In a case of a second authentication mode in which the user inputs single identification information only as the authentication information at the time of login, the registered authentication information 61 stored in the storage 6 acts as single identification information indicating the authorized user.

Figure 2:
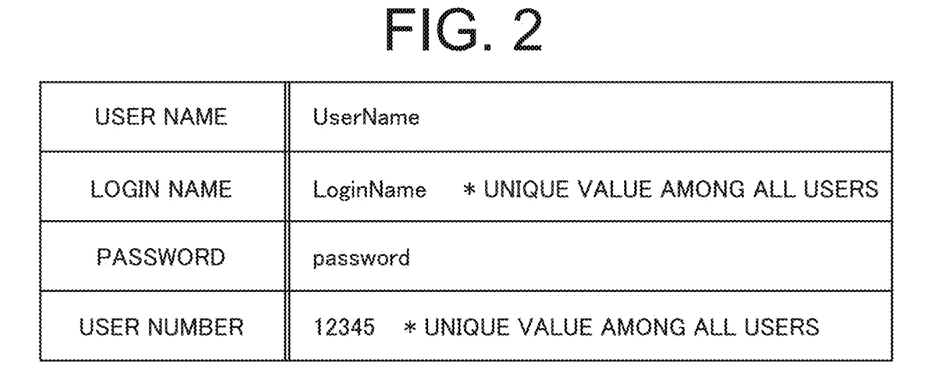
FIG. 2 is a diagram illustrating an example of registered authentication information in the image formation apparatus according to the embodiment of the present disclosure.

The single identification information is authentication information assigned in advance to the authorized user, and may be a user number obtained by combining any numbers or a character string obtained by combining any characters. For convenience of explanation, in the present embodiment, the user number will be used as the single identification information. In other words, the user number may be said to be single authentication information functioning both as the login name and the password. It is noted that the registered authentication information 61 may be stored in the storage 6 as table information in which the login name, the password, and the user number are associated for each user name, as illustrated in FIG. 2, for example. FIG. 2 is a diagram illustrating an example of the registered authentication information 61 in the image formation apparatus 100 according to the embodiment of the present disclosure.

The user specifying information 62 is information by which it is possible to specify the authorized user instructing printing of the image in the image formation apparatus 100, and an example thereof includes a user name indicating an authorized user. The user specifying information 62 is information different from the authentication information input by the user at the time of login. If the user inputs only the user number as the authentication information at the time of login and the image composer 54 adds, to the image, the information for specifying the user as the tracking information, the user specifying information 62 is used as the tracking information in place of the user number, which will be described in detail later.

Print Processing

Figure 3:
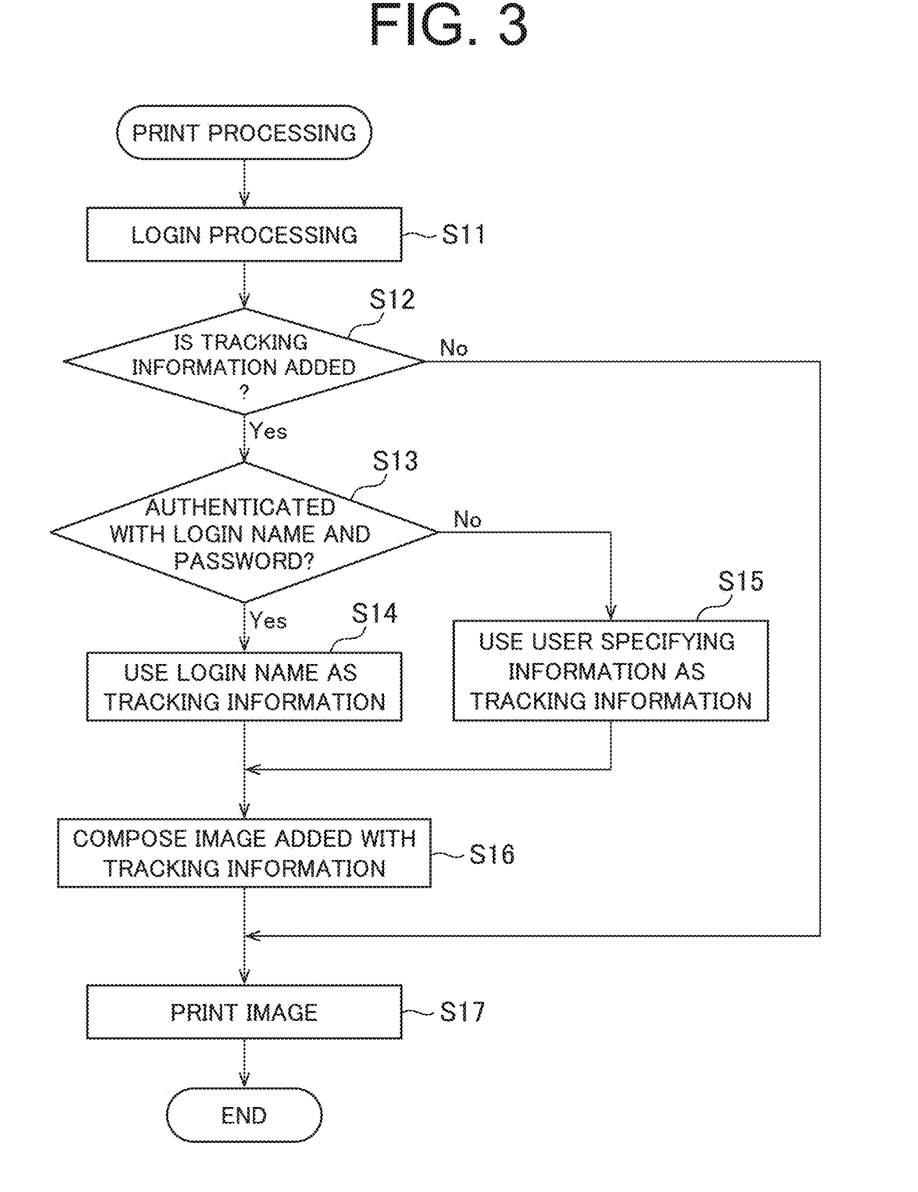
FIG. 3 is a flowchart illustrating an example of print processing executed by the image formation apparatus according to the embodiment of the present disclosure.

Next, the print processing in the image formation apparatus 100 according to the embodiment of the present disclosure will be described with reference to FIG. 3. FIG. 3 is a flowchart illustrating an example of the print processing executed by the image formation apparatus 100 according to the embodiment of the present disclosure.

As illustrated in FIG. 3, firstly, the image formation apparatus 100 executes login processing (step S11). In the login processing, the authenticator 53 identifies whether the user using the image formation apparatus 100 is the authorized user. It is noted that in the login processing, the processing, by the authenticator 53, of identifying whether the user using the image formation apparatus 100 is the authorized user, is called authentication.

Figure 4:
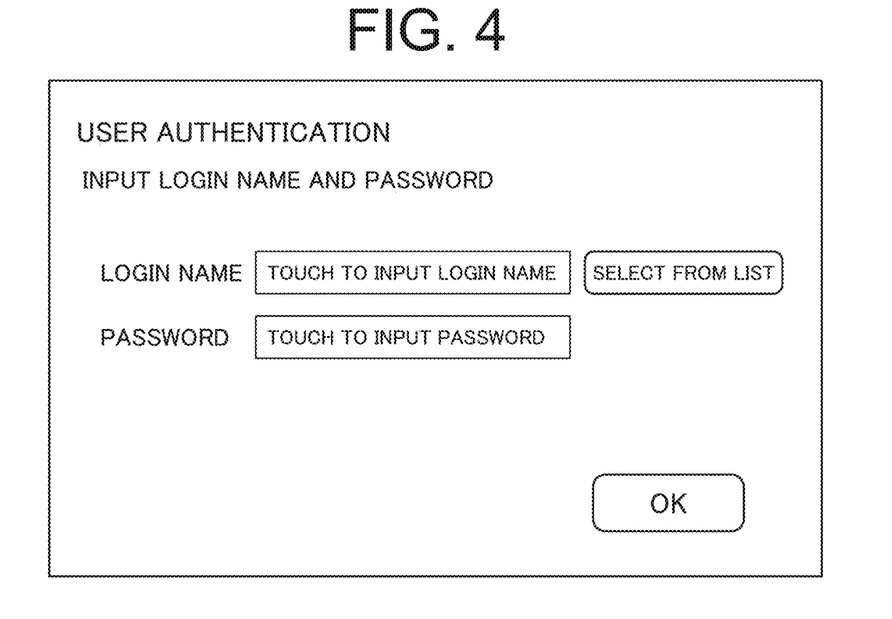
FIG. 4 is a diagram illustrating an example of an input screen for a login name and a password in the image formation apparatus according to the embodiment of the present disclosure.

For example, in the login processing, if the authenticator 53 performs the authentication with the login name and the password input by the user, the image formation apparatus 100 displays an input screen illustrated in FIG. 4 on the operation display unit 1 to prompt the user to input the login name and the password.

Figure 5:
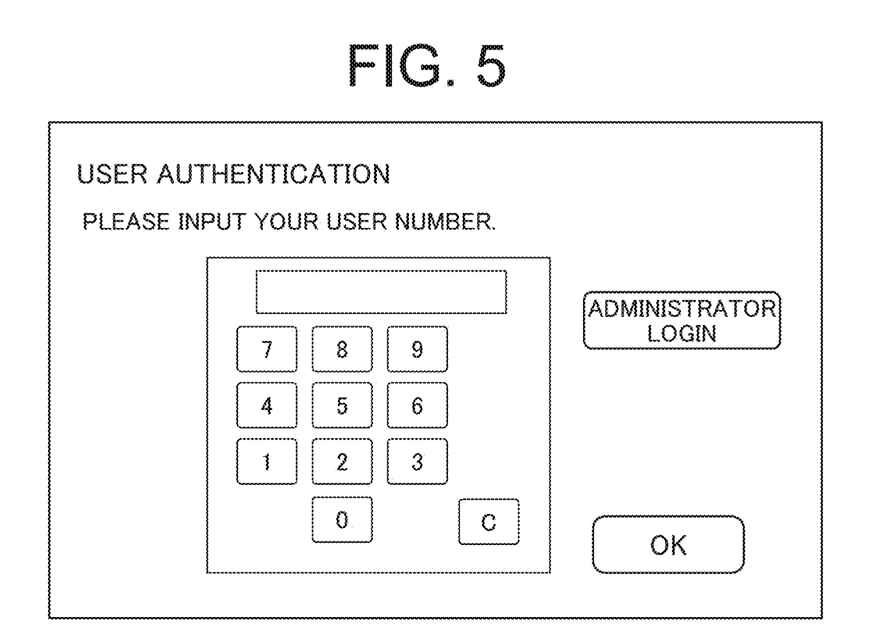
FIG. 5 is a diagram illustrating an example of an input screen for a user number in the image formation apparatus according to the embodiment of the present disclosure.

In the login processing, if the user is authenticated with the user number input by the user, in the image formation apparatus 100, the input screen illustrated in FIG. 5 is displayed on the operation display unit 1 to prompt the user to input the user number.

FIG. 4 is a diagram illustrating an example of the input screen for the login name and the password in the image formation apparatus 100 according to the embodiment of the present disclosure. That is, FIG. 4 illustrates the input screen displayed on the operation display unit 1 in the first authentication mode in which the login name and the password are accepted as the authentication information. FIG. 5 is a diagram illustrating an example of the input screen for the user number in the image formation apparatus 100 according to the embodiment of the present disclosure. That is, FIG. 5 illustrates the input screen displayed on the operation display unit 1 in the second authentication mode in which the user number is accepted as the authentication information.

It is noted that the second authentication mode has a lower security level than the first authentication mode. However, in the login processing, the user is encouraged to simply input the user number, and thus, it is possible to reduce a burden of the user.

As illustrated in FIG. 4, in a case of a configuration in which the login name and the password are input in the login processing, the operation display unit 1 displays an input screen indicating a text for requesting input of the login name and the password and input areas in which each of the login name and the password is input. The operation display unit 1 is configured to display a soft keyboard (not illustrated) when the user touches the input areas. Next, when the user uses the soft keyboard to input the login name and the password in the input areas and depresses an "OK" button provided at the lower right of the input screen, the input of the login name and the password is confirmed. The authenticator 53 authenticates the user with the login name and the password thus input.

As illustrated in FIG. 4, the input screen is provided with a "select from list" button. The operation display unit 1 is configured to display a list of registered login names when the user depresses the "select from list" button. This allows the user to select the login name from the displayed list of registered login names to input the login name.

On the other hand, as illustrated in FIG. 5, in a case of a configuration in which the user number is input in the login processing, the operation display unit 1 displays an input screen displayed with the text for requesting the input of the user number and a numeric keypad for entering the user number. Next, when the user depresses the numeric keypad to input the user number to depress the "OK" button provided at the lower right of the input screen to confirm the input of the user number. The authenticator 53 authenticates the user with the user number thus input.

It is noted that as illustrated in FIG. 5, an "administrator login" button may be provided in the input screen. The operation display unit 1 displays an unillustrated soft keyboard when the user depresses the "administrator login" button. Next, if the user uses the soft keyboard to input an administrator password, the user can log into the system as an administrator.

The operation display unit 1 is configured by which the screen is set to be switched between the input screen of the first authentication mode illustrated in FIG. 4 and the input screen of the second authentication mode illustrated in FIG. 5. Thus, the image formation apparatus 100 is configured so that the authentication mode is switched to an appropriate authentication mode by the operation display unit 1 considering the required security level or the burden of the user in the login processing.

Figure 6:
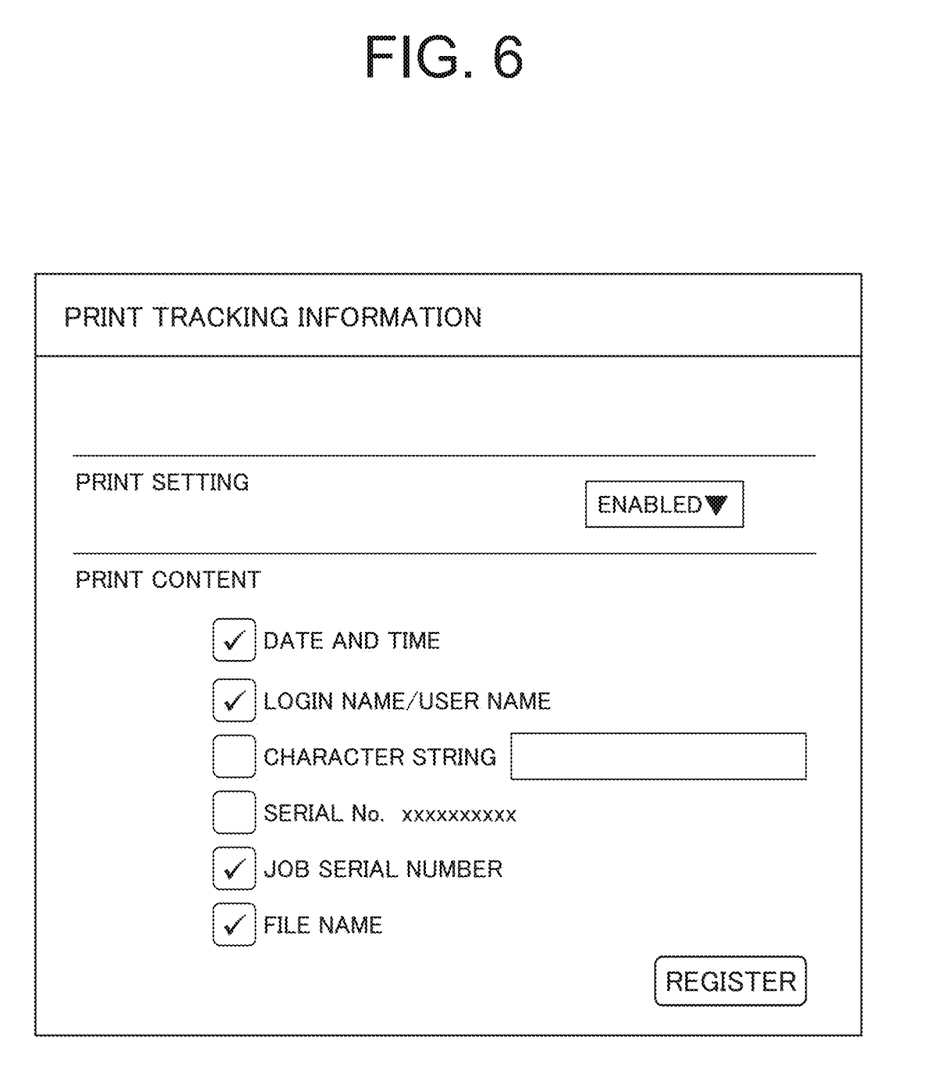
FIG. 6 is a diagram illustrating an example of a printing setting screen of tracking information in the image formation apparatus according to the embodiment of the present disclosure.

Next, in the image formation apparatus 100, the image composer 54 determines whether to add the tracking information (step S12). Specifically, as illustrated in FIG. 6, the operation display unit 1 displays a printing setting screen of the tracking information to prompt for a user input. FIG. 6 is a diagram illustrating an example of the printing setting screen of the tracking information in the image formation apparatus 100 according to the embodiment of the present disclosure.

If the printing setting is set to "valid" on the printing setting screen of the tracking information, the image composer 54 determines to add the tracking information to the image ("Yes" in step S12). This turns "ON" a composite function of the tracking information by the image composer 54.

In a case where an item of the printing of the login name/user name is checked in a content to be printed of the printing setting screen of the tracking information, the image composer 54 adds the login name to the tracking information or the user specifying information 62 corresponding to the user name to the image. In the present embodiment, the user name is adopted as the user specifying information 62 corresponding to the user number. In addition, examples of a content to be printed include a date and a time when the image was printed, any character string, a serial number to specify the image formation apparatus 100, a job serial number of a printed image, and a file name of image data for generating an image. The image formation apparatus 100 is configured to include a checked item in such items into the tracking information and add such tracking information to the image.

On the other hand, if the printing setting is not set to "valid" on the printing setting screen of the tracking information, the image composer 54 determines not to add the tracking information to the image formed by the image former 4 ("No" in step S12). If the tracking information is not added, the processing proceeds to step S17, and the image former 4 prints the image generated by the image composer 54 on a sheet.

If "Yes" in step S12, that is, if the tracking information is to be added, in the login processing, the image composer 54 determines whether the user is authenticated by the input of the login name and the password (step S13). If the image composer 54 determines that the user is authenticated by the input of the login name and the password ("Yes" in step S13), it is determined to use the login name as the information for specifying the user included in the tracking information (step S14). The image composer 54 composes an image added with the tracking information including the login name (step S16).

On the other hand, if the image composer 54 determines in the login processing that the user is not authenticated by the input of the login name and the password ("No" in step S13), that is, if the image composer 54 determines that the user is authenticated by the input of the user number, the image composer 54 reads the user specifying information 62 corresponding to the user number read from the storage 6. Next, the image composer 54 determines to use the user specifying information 62 as the information for specifying the user included in the tracking information (step S15). The image composer 54 composes an image added with the tracking information including the user specifying information 62 (step S16). It is noted that in addition to the above-described user specifying information 62, the image composer 54 generates an image in which also the information on the item of the content to be printed checked in the printing setting screen illustrated in FIG. 6 is included in the tracking information. Next, the image former 4 prints the image generated by the image composer 54 on a sheet (step S17).

Thus, the image formation apparatus 100 has two authentication patterns in the login processing, that is, the first authentication mode in which the input login name and password are used, and the second authentication mode in which the input user number is used. Such two authentication patterns may be switched by operating the operation display unit 1 in the image formation apparatus 100.

Here, a case is assumed where the user number is not assigned to the user when the first authentication mode is switched to the second authentication mode. In such a case, if the login name includes any numbers only, and a display format of the login name matches that of the user number, the image formation apparatus 100 may be configured to utilize the login name as the user number.

If it is not possible to utilize the login name as the user number due to a reason such as a reason that the login name does not match in display format with the user number, the image formation apparatus 100 may be configured to allow the user to log in the system as an administrator to set the user number. At this time, the user specifying information 62 associated with the newly set user number is also set.

Figure 7:
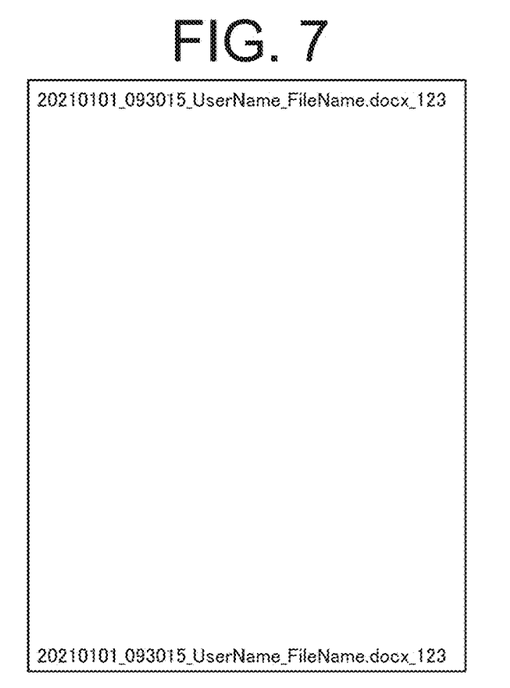
FIG. 7 is a diagram illustrating an example of an image added with tracking information according to the embodiment of the present disclosure.
Figure 8:
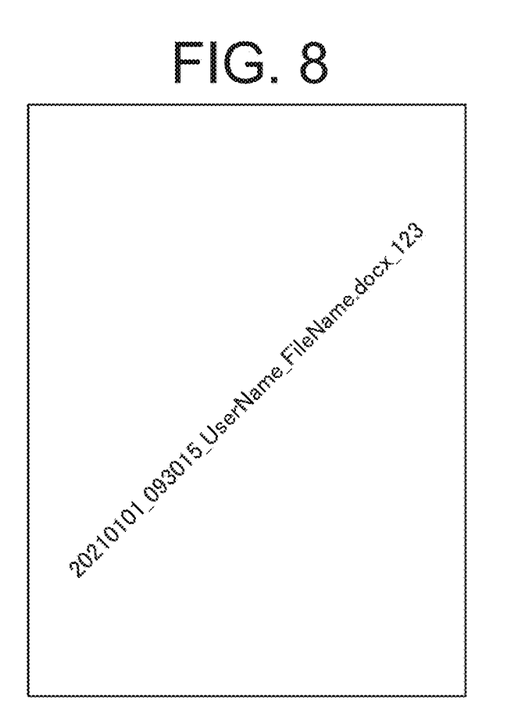
FIG. 8 is a diagram illustrating an example of an image added with tracking information according to the embodiment of the present disclosure.
Figure 9:
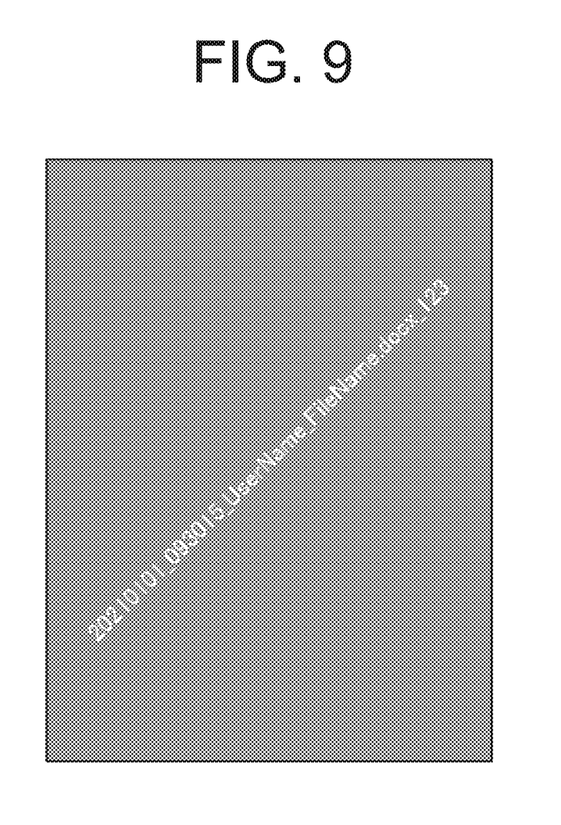
FIG. 9 is a diagram illustrating an example of an image added with tracking information according to the embodiment of the present disclosure.

Next, the image composed by being added with the tracking information by the image composer 54 will be described with reference to FIGS. 7 to 9. FIGS. 7 to 9 are diagrams each illustrating an example of the image added with the tracking information according to the embodiment of the present disclosure. For convenience of explanation, in FIGS. 7 to 9, only the tracking information added to the image is illustrated and the image to be printed is omitted.

For example, when a date on which the image is printed is "January 1, 2021 (01/01/2021)", a time is "9:30:15 (09:30:15)", the user specifying information 62 corresponding to the user number is "UserName", a file name of an image to be printed is "FileName.docx", and a job serial number is "123", such information is to be included in the tracking information. At this time, if the user is authenticated by the user number in the login processing and the tracking information is added to the image, the image added with the tracking information by the image composer 54 is an image in which a character string "20210101_093015_UserName_FileName.docx_123" is added to a header portion located at an upper part of the sheet printed with the image and a footer portion located at a lower part of the sheet, as illustrated in FIG. 7.

It is possible to know the date and the time when such an image is printed, the user who executes the printing, the file name, and the job serial number, from the sheet printed with the image added in this way. As the information for specifying the user who executes the printing, the user number used for the authentication of the login is not used, and thus, it is possible to prevent unauthorized login by a third party utilizing the user number. This allows the image formation apparatus 100 to output the image added appropriately with the tracking information.

In the image formation apparatus 100, if the single identification information is input as the authentication information input in the login processing, while the image composer 54 adds the tracking information to the image, when the user specifying information 62 corresponding to such single identification information is not stored in the storage 6, "N/A" may be printed instead of "UserName" in the added tracking information.

The tracking information indicated by the character string "20210101_093015_UserName_FileName.docx_123" is not limited to the configuration of being added to the header portion and the footer portion as described above. The tracking information may be added either to the header portion or the footer portion.

The tracking information may be added to a back side of the image to be overlaid with the image as a watermark as illustrated in FIG. 8, and may be added to the back side of the image to be overlaid with the image as a ground tint as illustrated in FIG. 9.

Figure 10:
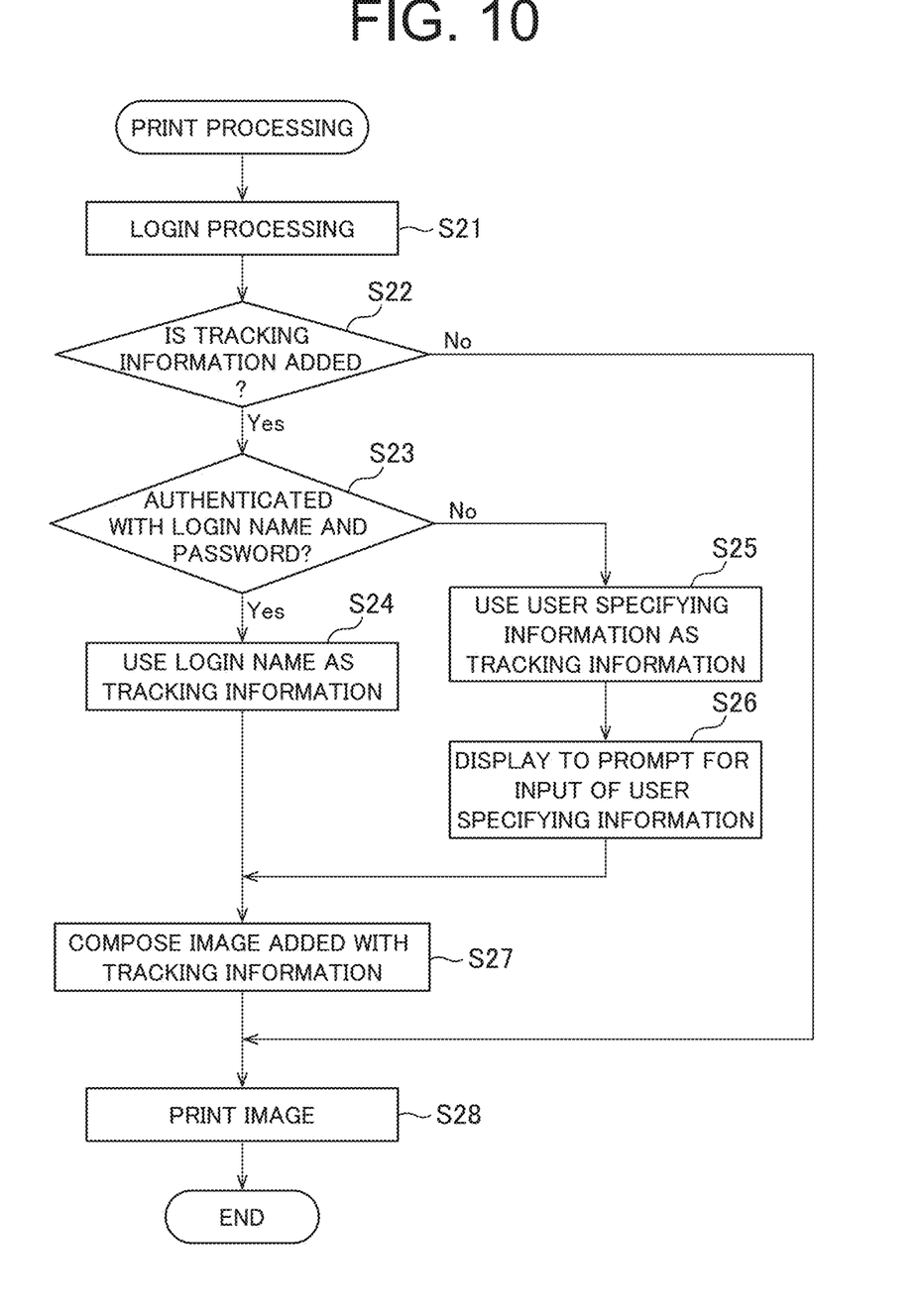
FIG. 10 is a flowchart illustrating an example of print processing executed by an image formation apparatus according to a first modification of the embodiment of the present disclosure.

It is noted that the user specifying information 62, which is the information previously stored in the storage 6, is not limited thereto. For example, the user specifying information 62 may be information set by the user when the print processing is executed. In such a case of a configuration in which the user specifying information 62 is set when the print processing is executed, the image formation apparatus 100 implements the print processing as illustrated in FIG. 10. FIG. 10 is a flowchart illustrating an example of the print processing executed by the image formation apparatus 100 according to a first modification of the embodiment of the present disclosure.

In the print processing executed by the image formation apparatus 100 according to the first modification of the embodiment, steps S21 to S25 and steps S27 to S28 are similar to steps S11 to S17 of the print processing executed by the image formation apparatus 100 according to the embodiment illustrated in FIG. 3, and thus, a description of such processing will be omitted.

Figure 11:
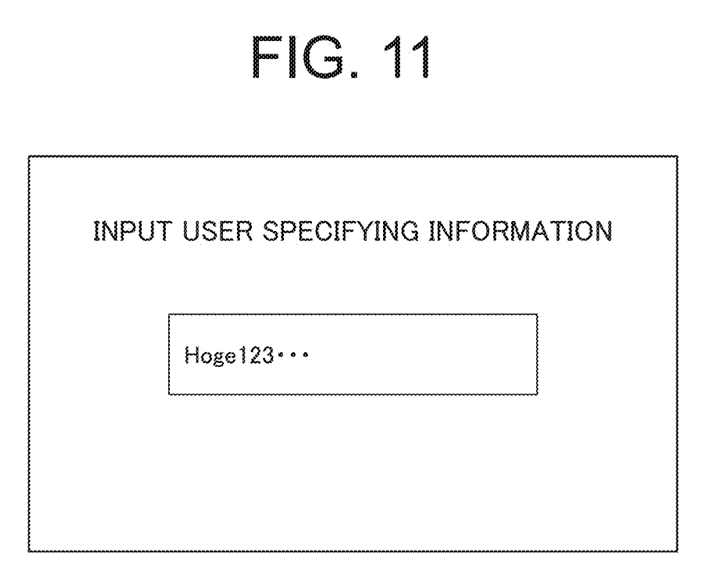
FIG. 11 is a diagram illustrating an example of a display to prompt for input of user specifying information in the image formation apparatus according to the first modification of the embodiment of the present disclosure.

In the image formation apparatus 100 according to the first modification of the embodiment, in step S25 of the print processing illustrated in FIG. 10, when the image composer 54 determines to use the user specifying information 62 as the tracking information, an indication to prompt for input of the user specifying information 62 is displayed in the operation display unit 1. For example, the operation display unit 1 performs a display as illustrated in FIG. 11 as a display to prompt for input of the user specifying information 62. FIG. 11 is a diagram illustrating an example of the display to prompt for input of the user specifying information 62 in the image formation apparatus 100 according to the first modification of the embodiment of the present disclosure. As illustrated in FIG. 11, the operation display unit 1 displays a text for requesting the input of the user specifying information 62, and an input screen displaying an input area for inputting the user specifying information 62. Information input by the authorized user in response to such a display is used by the image composer 54 as the user specifying information 62. It is noted that the image composer 54 determines whether the information input by the user as the user specifying information 62 matches the user number. When the image composer 54 determines that the information input as the user specifying information 62 matches the user number, the operation display unit 1 displays a notification that the user specifying information 62 input by the user is not appropriate, and a notification to prompt for reinput. In determining that the information input by the user as the user specifying information 62 does not match the user number, the image composer 54 finalizes that the input information is the user specifying information 62.

Figure 12:
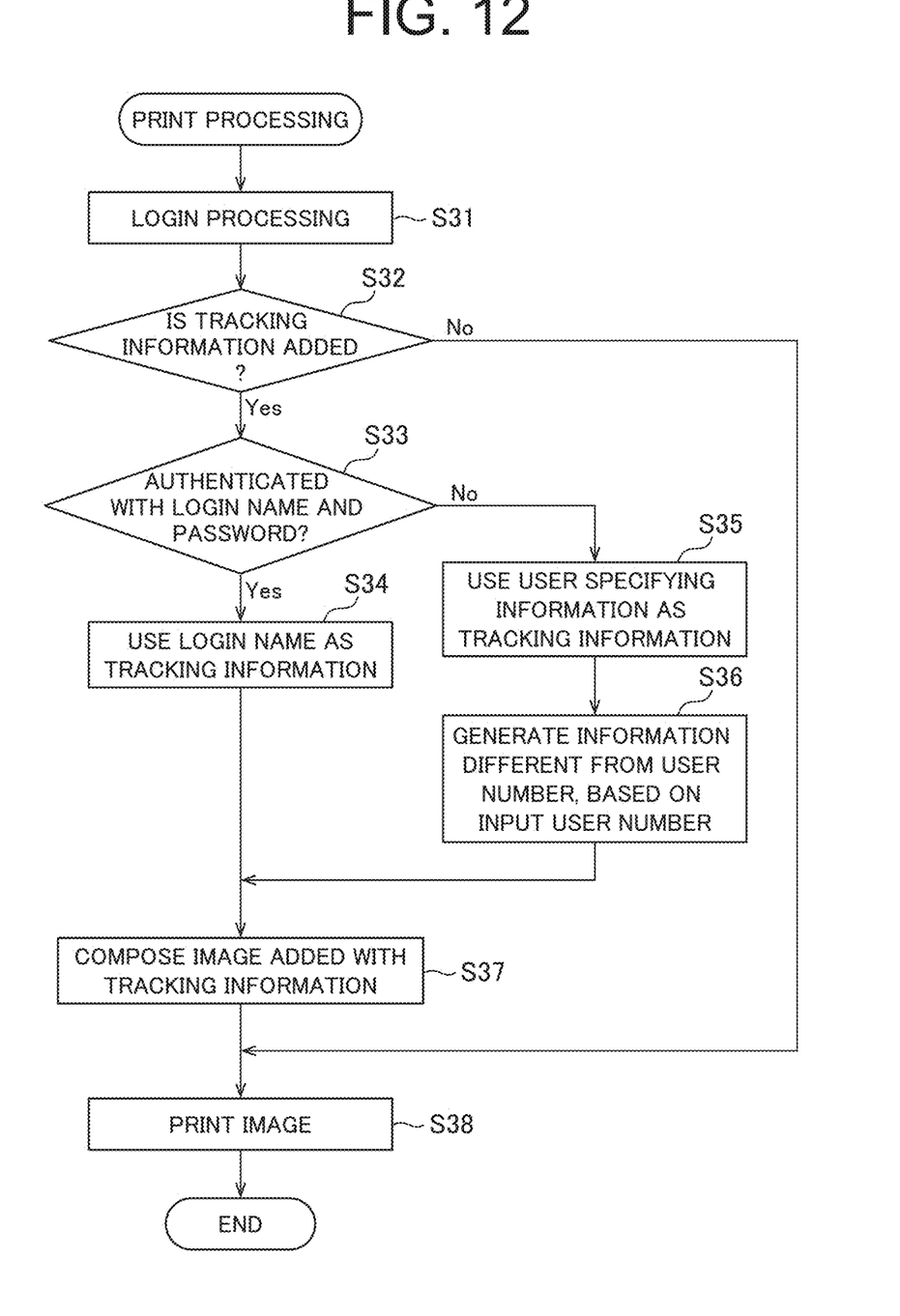
FIG. 12 is a flowchart illustrating an example of print processing executed by an image formation apparatus according to a second modification of the embodiment of the present disclosure.

Alternatively, the user specifying information 62 may be information different from the user number generated based on the user number input by the user. If the user specifying information 62 is the information that is generated based on the user number and is different from the user number, the image formation apparatus 100 performs the print processing as illustrated in FIG. 12. FIG. 12 is a flowchart illustrating an example of the print processing executed by the image formation apparatus 100 according to a second modification of the embodiment of the present disclosure.

In the print processing executed by the image formation apparatus 100 according to the second modification of the embodiment, steps S31 to S35 and steps S37 to S38 are similar to steps S11 to S17 of the print processing executed by the image formation apparatus 100 according to the embodiment illustrated in FIG. 3, and thus, a description of such processing will be omitted.

In the image formation apparatus 100 according to the second modification of the embodiment, in step S35 of the print processing illustrated in FIG. 12, when the image composer 54 determines to use the user specifying information 62 as the tracking information, the image composer 54 generates information in which a part of the input user number is modified, and uses the generated information as the user specifying information 62. For example, if the input user number is "12345", the image composer 54 generates information such as "12**" or "**45" as the user specifying information 62.

Figure 13:
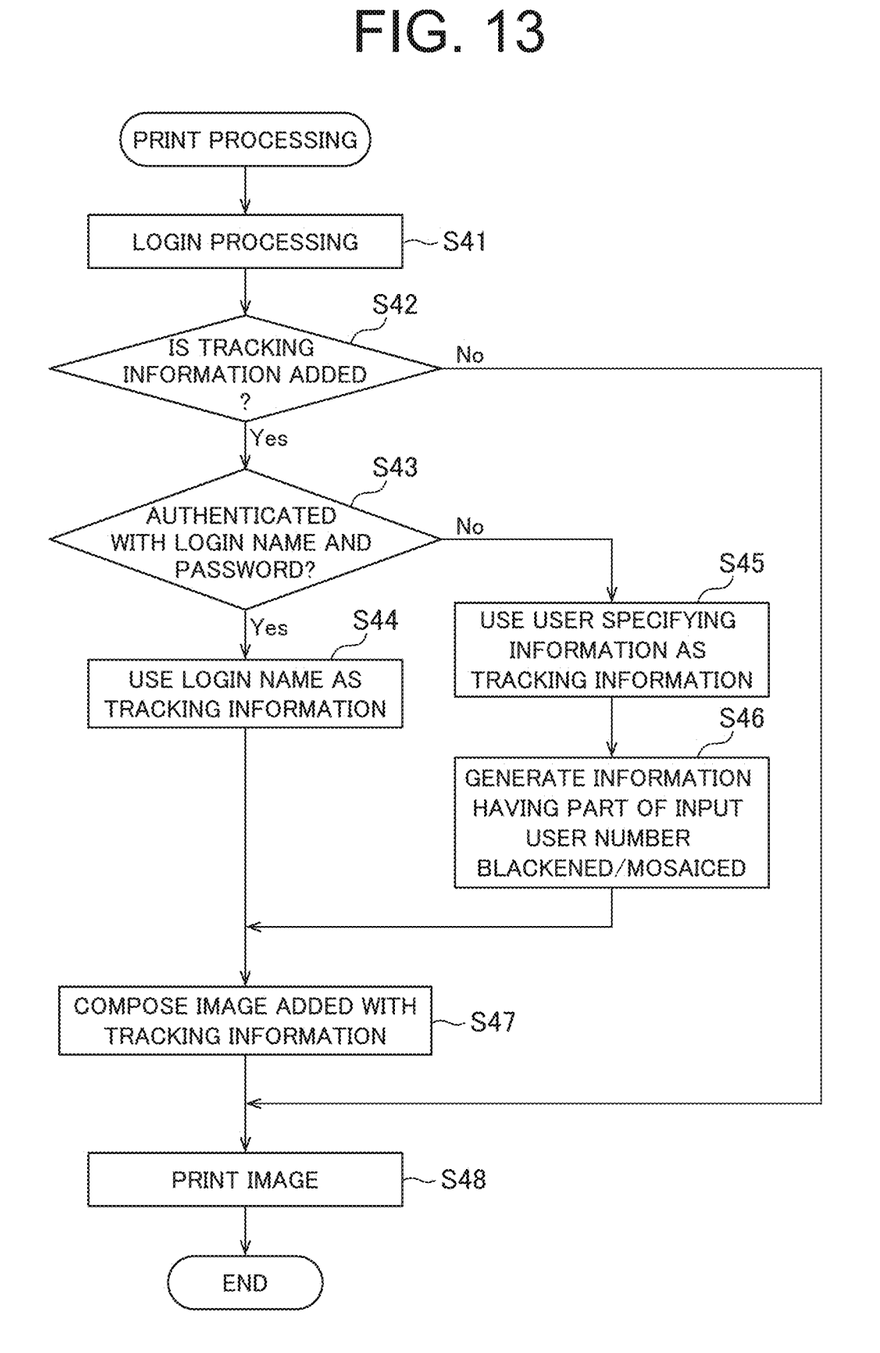
FIG. 13 is a flowchart illustrating an example of print processing executed by an image formation apparatus according to a third modification of the embodiment of the present disclosure.

Alternatively, the user specifying information 62 may be information in which a part of the user number input by the user is blackened or mosaiced. In this way, if the user specifying information 62 is information in which a part of the user number is blackened or mosaiced, the image formation apparatus 100 performs the print processing as illustrated in FIG. 13. FIG. 13 is a flowchart illustrating an example of the print processing executed by the image formation apparatus 100 according to a third modification of the embodiment of the present disclosure.

In the print processing executed by the image formation apparatus 100 according to the third modification of the embodiment, steps S41 to S45 and steps S47 to S48 are similar to steps S11 to S17 of the print processing executed by the image formation apparatus 100 according to the embodiment illustrated in FIG. 3, and thus, a description of such processing will be omitted.

In the image formation apparatus 100 according to the third modification of the embodiment, in step S45 of the print processing illustrated in FIG. 13, when the image composer 54 determines to use the user specifying information 62 as the tracking information, the image composer 54 generates information in which a part of the input user number is blackened or mosaiced, and uses the generated information as the user specifying information 62.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image formation apparatus comprising:
   an accepting portion that accepts authentication information for identifying whether a user is an authorized user having a right to use the image formation apparatus;
   an authenticator that authenticates whether the user is the authorized user, based on the authentication information accepted by the accepting portion; and
   an adder that adds, to an image to be printed, tracking information including information for specifying the user authenticated as the authorized user by the authenticator, wherein
   if the authentication information accepted by the accepting portion is single identification information, the adder adds, as the tracking information, to the image, user specifying information for specifying the user authenticated as the authorized user, the user specifying information being different from the single identification information.

2. The image formation apparatus according to claim 1, wherein the user specifying information is a user name being associated with the single identification information and indicating the user authenticated as the authorized user.

3. The image formation apparatus according to claim 1, comprising: an outputter that outputs, if the authentication information is the single identification information, information prompting the user authenticated as the authorized user to input the user specifying information, to, wherein
   the user specifying information is information input according to the information prompting input of the user specifying information output by the outputter.

4. The image formation apparatus according to claim 1, comprising: a setter that sets switching between a first authentication mode for accepting, by the accepting portion, a login name and a password as the authentication information and a second authentication mode for accepting, by the accepting portion, the single identification information as the authentication information, wherein
   if the first authentication mode is switched to the second authentication mode by the setter, when the login name is the same in expression format as the single identification information, the login name used in the first authentication mode is set as the single identification information used in the second authentication mode.

5. The image formation apparatus according to claim 1, wherein the adder adds the tracking information to the image so that the tracking information is printed on at least one of a header portion located at an upper part of a sheet on which the image is printed and a footer portion located at a lower part of the sheet.

6. The image formation apparatus according to claim 1, wherein the adder adds the tracking information to be overlaid with the image as a watermark or a ground tint.

7. The image formation apparatus according to claim 1, wherein the tracking information includes, in addition to the information for specifying the user, at least one of a date and a time when the image is printed, any character string, a file name of image data for generating the image, a job serial number of the image that is printed, and a serial number for specifying the image formation apparatus that has performed the image printing.

8. A method for controlling an image formation apparatus comprising:
- accepting authentication information for identifying whether a user is an authorized user having a right to use the image formation apparatus;
- authenticating whether the user is the authorized user, based on the authentication information accepted in the accepting; and
- adding, to an image to be printed, tracking information including information for specifying the user authenticated as the authorized user in the authenticating, wherein
- if the authentication information accepted in the accepting is single identification information, user specifying information for specifying the user authenticated as the authorized user is added to the image as the tracking information in the accepting, the user specifying information being different from the single identification information.

* * * * *

UNITED STATES PATENT AND TRADEMARK OFFICE
CERTIFICATE OF CORRECTION

PATENT NO. : 11,880,615 B2
APPLICATION NO. : 18/138104
DATED : January 23, 2024
INVENTOR(S) : Sho Tsujimoto It is certified that error appears in the above-identified patent and that said Letters Patent is hereby corrected as shown below:

On the Title Page

Item (63), Lines 1-3, "Related U.S. Application Data" should be deleted.

Signed and Sealed this
Eighth Day of October, 2024

Katherine Kelly Vidal
*Director of the United States Patent and Trademark Office*